Dec. 18, 1962  N. R. BABAJOFF  3,069,122
PERFORATED BOARD CLIP RETAINER
Filed Nov. 9, 1959
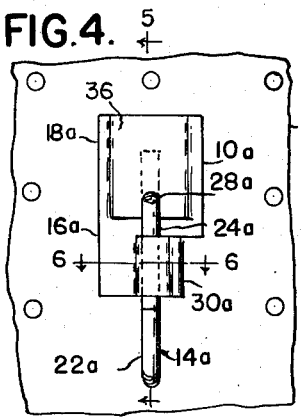
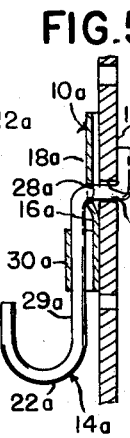
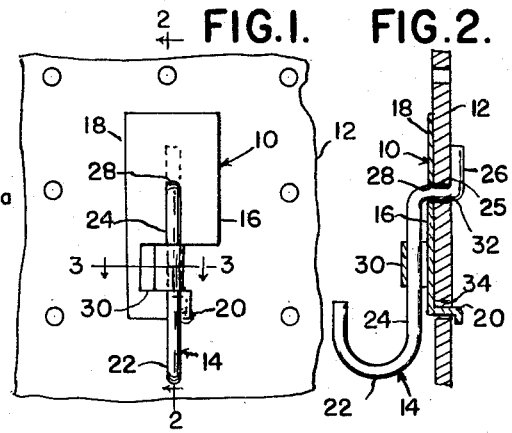
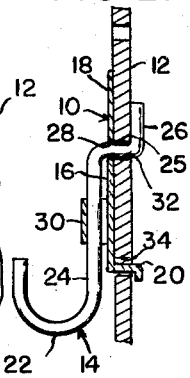
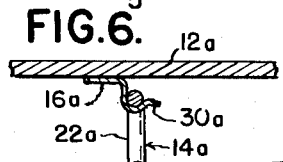
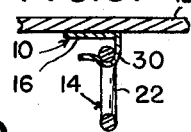
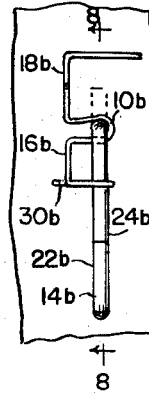
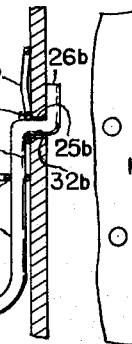
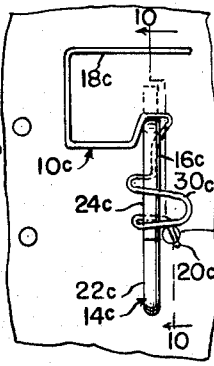
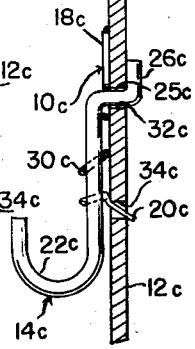
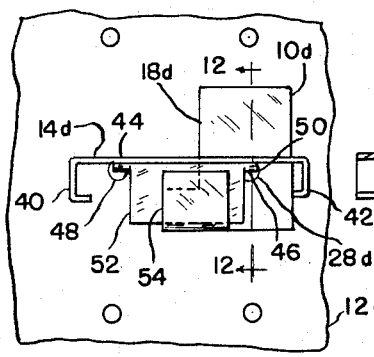
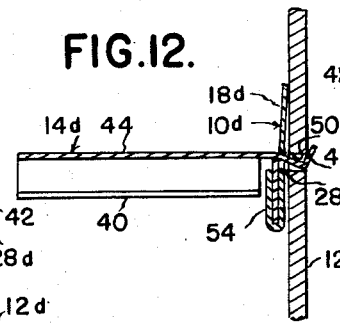
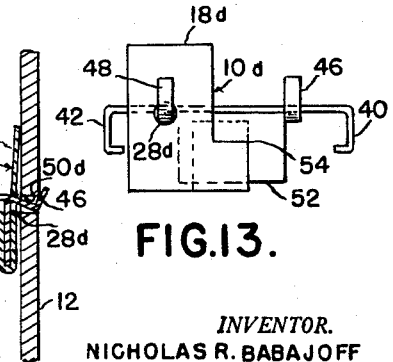
INVENTOR.
NICHOLAS R. BABAJOFF
BY Whittemore
Hulbert & Belknap
ATTORNEYS

United States Patent Office 3,069,122
Patented Dec. 18, 1962

3,069,122
PERFORATED BOARD CLIP RETAINER
Nicholas R. Babajoff, 1685 W. Lincoln St.,
Birmingham, Mich.
Filed Nov. 9, 1959, Ser. No. 851,730
5 Claims. (Cl. 248—223)

The invention relates to perforated board clip retainers and refers more specifically to a perforated board clip retainer adapted to prevent rotation of a perforated board fixture positioned on said perforated board about an axis in the plane of the perforated board which perforated board clip retainer requires no modification of either the perforated board or the perforated board fixture for assembly thereof with the perforated board and perforated board fixture and which allows such assembly on rotation of the perforated board clip retainer about an axis perpendicular to the plane of the perforated board.

Perforated boards and perforated board article supporting fixtures are well known and are useful in the preparation of displays, hanging tools, and the like. In the past, use of the perforated boards and hook type perforated board fixtures assembled thereon has been somewhat limited due to the fact that the clips often rotate out of position in use or become entirely disconnected from the perforated board.

In the past attempts at providing perforated board clip retainers to prevent such rotation and disconnection of the perforated board fixtures have been unsatisfactory. Often the clip retainer means provided are resiliently retained with respect to the perforated board, and, therefore, may easily become disengaged from the perforated board. Also many perforated board clip retainers in the past have required modification of the perforated board or fixtures for installation thereof so that they are economically unsatisfactory.

It is, therefore, an object of the present invention to provide a perforated board clip retainer adapted to prevent rotation of the perforated board fixture assembled with the perforated board about an axis in the plane of the perforated board and which requires no modification of the perforated board or perforated board fixture for attachment thereof.

Another object is to provide a clip retainer for use with a perforated board fixture which clip retainer is adapted to be held in assembled position with respect to a perforated board and assembled with a perforated board fixture on rotation of the perforated board fixture about an axis perpendicular to said perforated board.

Another object is to provide a clip retainer for use with a perforated board fixture which will prevent movement of the perforated board fixture in assembly on a perforated board and which is not itself subject to being easily disengaged from the perforated board or fixture in use.

More specifically, it is an object to provide a perforated board clip retainer including a body portion passing in front of the body portion of a perforated board fixture which securely grips the perforated board fixture and which further includes a heel portion operable to prevent rotation of both the perforated board clip retainer and perforated board fixture about an axis through the opening in the perforated board through which the perforated board fixture extends and in the plane of the perforated board.

More specifically, it is an object to provide a perforated board clip retainer including a body portion passing in front of the body of a perforated board fixture which body portion is secured to the perforated board fixture and a heel portion operable to prevent rotation of both the perforated board fixture and clip retainer about an axis in the plane of the perforated board, said clip retainer also including a toe portion operable to prevent rotation of the perforated board clip retainer in assembly with the perforated board fixture about an axis substantially perpendicular to the perforated board.

Still more specifically, it is an object to provide a perforated board clip retainer including a substantially flat body part having an opening therein through which a perforated board fixture may extend and also having a rigid part extending outwardly therefrom formed to pass over and grip the body portion of the perforated board fixture, and also including a substantially flat heel portion connected to said body portion and extending along the surface of the perforated board for a substantial distance from said opening, said clip retainer also including a toe portion depending from the clip retainer and adapted to extend into one of the openings in the perforated board to prevent rotation of the perforated board clip retainer in assembly with said perforated board fixture about an axis perpendicular to the perforated board.

Still more specifically it is an object to provide a perforated board clip retainer comprising a wire member including a body portion having a part substantially surrounding and a part adapted to wrap around the body portion of a perforated board fixture to secure the clip retainer and perforated board fixture in assembly and also including a portion extending a substantial distance along the surface of the perforated board beyond the perforated board fixture to prevent rotation of the perforated board fixture and clip retainer about an axis in the plane of the perforated board, said clip retainer also including a portion adapted to extend into one of the openings of the perforated board to prevent rotation of the clip retainer in assembly with the perforated board fixture about an axis perpendicular to the perforated board.

A further object of the present invention is to provide a perforated board clip retainer adapted to prevent the rotation of a perforated board fixture, such as a container top, from rotating about an axis in the plane of the perforated board, comprising a substantially flat member including an opening therein through which a portion of the perforated board fixture may pass to extend through an opening in the perforated board, and including an open returned end portion adapted to fit over a stabilizing portion of the perforated board fixture which stabilizing portion extends along the surface of the perforated board, said flat member also including a heel portion extending a substantial distance beyond the perforated board fixture operable to prevent rotation of the perforated board fixture and clip retainer about an axis in the plane of the perforated board.

Other objects and features of the invention will become apparent as the description proceeds, especially when taken in conjunction with the accompanying drawings illustrating a preferred embodiment of the invention, wherein:

FIGURE 1 is an elevational view of a portion of perforated board illustrating a perforated board fixture positioned thereon and a perforated board clip retainer according to the invention in assembly therewith.

FIGURE 2 is a sectional view of the perforated board fixture and clip retainer illustrated in FIGURE 1 taken on the line 2—2 in FIGURE 1.

FIGURE 3 is a cross-section of the structure illustrated in FIGURE 1 taken on the line 3—3 in FIGURE 1.

FIGURE 4 is an elevational view of a structure similar to that illustrated in FIGURE 1 including a modified perforated board clip retainer.

FIGURE 5 is a sectional view of the structure illustrated in FIGURE 4 taken on the line 5—5 in FIGURE 4.

FIGURE 6 is a cross-sectional view of the structure illustrated in FIGURE 4 taken on the line 6—6 in FIGURE 4.

FIGURE 7 is an elevational view of a perforated board and perforated board fixture as shown in FIGURES 2 and 4, and further illustrates a modified clip retainer.

FIGURE 8 is a sectional view of the structure illustrated in FIGURE 7 taken on the line 8—8 in FIGURE 7.

FIGURE 9 is an elevational view of a structure similar to that illustrated in FIGURE 7 and including a modified perforated board clip retainer.

FIGURE 10 is a sectional view of the structure illustrated in FIGURE 9 taken on line 10—10 in FIGURE 9.

FIGURE 11 is an elevational view of a perforated board fixture adapted to support and act as a cover for a container and a perforated board clip retainer for use in preventing displacement thereof according to the invention.

FIGURE 12 is a sectional view of the structure illustrated in FIGURE 11 taken on the line 12—12 in FIGURE 11.

FIGURE 13 is a rear elevational view of the perforated board fixture and clip retainer illustrated in FIGURE 11 with the perforated board removed therefrom.

With reference to the drawings, a preferred embodiment of the invention will now be described.

A perforated board clip retainer generally indicated 10 is shown in FIGURE 1 in assembly with a perforated board 12 and a hook type perforated board fixture 14 mounted on the perforated board. As shown, the perforated board clip retainer comprises a body portion 16, a heel portion 18, and a toe portion 20. The perforated board fixture 14 includes the article supporting portion 22, body portion 24, supporting portion 25, and locking portion 26. In assembly, as shown, the perforated board clip retainer prevents movement of the perforated board fixture from the position illustrated.

As illustrated, the body portion 16 of the retaining clip 10, in FIGURE 1, is substantially flat and may be made of any formable rigid material which has some resiliency, such as most metals and plastics. The body portion 16 is provided with an opening 28 therethrough through which the perforated board fixture may pass to extend through one of the openings 32 in the perforated board 12, as shown best in FIGURE 2. The clip retainer is thus held in assembled relation with a perforated board fixture. The body portion 16 of the clip retainer is further provided with a part 30 which is struck out from the body portion 16 and wrapped around the body portion 24 of the perforated board fixture as shown to securely hold the perforated board fixture against movement relative to the clip retainer outwardly of the perforated board but allows rotation of the fixture relative to the clip retainer about an axis perpendicular to the perforated board for assembly of the fixture with the clip retainer.

The clip retainer 10 as shown in FIGURE 1 is further provided with an upwardly extending heel portion 18, which is an extension of the substantially flat body portion 16 and which is provided to prevent rotation of the clip retainer and attached perforated board clip about an axis within the plane of the perforated board through the opening therein through which the locking portion 26 of the perforated board clip extends. Since the material from which the clip retainer is produced is slightly resilient should the supporting clip tend to rotate about an axis, as just described, the outer edge of the heel portion will be pressed firmly against the surface of the perforated board and will allow only slight rotation of the perforated board clip due to the resiliency of the clip retainer before further rotation is prohibited.

The clip retainer is also provided with a toe portion 20, as previously indicated, which extends, as shown best in FIGURE 2 inwardly toward the perforated board from the body portion 16 of the clip retainer and which is terminated in a perpendicularly extending portion adapted to pass through opening 34 and lock against the rear surface of the perforated board. The toe portion 20 is so positioned as to extend into an opening in the perforated board whereby rotation of the perforated board fixture and the clip retainer about an axis perpendicular to the perforated board through the opening through which the locking portion of the perforated board clip extends is restrained when the fixture and clip retainer are in assembly. As previously indicated such rotation is allowed by applicant's construction for assembly on the fixture and clip retainer.

In assembly, a perforated board fixture 14 and clip retainer 10 are first assembled by passing the locking portion 26 of the perforated board fixture through the opening 28 in the clip retainer. The clip retainer is then rotated counterclockwise with respect to the perforated board fixture, as shown in FIGURE 1, so that the heel portion of the clip retainer extends at right angles to the body portion of the perforated board fixture to permit the insertion of the locking portion 26 of the perforated board fixture 14 through an opening 32 in the perforated board 12. The clip retainer may then be rotated clockwise with respect to the perforated board fixture 14 into the position illustrated in FIGURE 1 wherein the portion 30 thereof passes in front of the perforated board fixture 14 and the toe portion 20 extends through a second opening 34 in the perforated board.

When so assembled, as previously indicated, the heel portion 18 of the retainer clip 10 operates to prevent the perforated board fixture from rotating about an axis in the plane of the perforated board through the opening 32. The toe portion 20 of the clip retainer operates to restrain the perforated board fixture from rotating about an axis perpendicular to the plane of the perforated board through the opening 32 therein. This later rotation is of course necessary in the initial assembly of the clip retainer and fixture.

A modified clip retainer 10a is illustrated in conjunction with the perforated board 12a and perforated board fixture 14a in FIGURES 4, 5 and 6. The clip retainer 10a is similar to the clip retainer 10 in that it includes a body portion 16a and a heel portion 19a which are adapted to perform substantially the same functions as the body portion 16 and heel portion 18 of the clip retainer 10. The clip retainer 10a is not, however, provided with a toe portion. As will be noted, however, the outer edge portions of the heel portion 18a of the retaining clip 10a are inclined inwardly toward the perforated board along the vertical lines 36 so that they more firmly contact the surface of the perforated board 10a to thus partly perform the function of the toe member 20 of the clip retainer 10 in that rotation of the perforated board fixture 14a about an axis perpendicular to the perforated board is restrained thereby. The inwardly inclined edges also add rigidity to heel portion 18a of retaining clip 10a. Also, it will be noted that in the modified clip retainer 10a, the part 30a of the body portion 16a is struck out and passed over the front of the body portion of the perforated board fixture 14a rather than being wrapped around the perforated board fixture as the part 30 of the clip retainer 10 is.

Another modification of the retainer clip of the invention is illustrated in FIGURES 7 and 8. As illustrated best in FIGURE 7, the clip retainer 10b is produced from resilient wire bent to the configuration shown and includes a body portion 16b having a part 30b adapted to wrap around the body portion 24b of the perforated board fixture 14b and a part which is wrapped around the perforated board fixture 14b at the junction of the supporting portion and the body portion thereof whereby the perforated board fixture 14b is securely gripped by the clip retainer 10b. Clip retainer 10b also includes an upwardly and horizontally extending heel portion 18b which performs the same function as the heel portions 18 and 18a of the clip retainers 10 and 10a. No toe portion is provided on the clip retainer 10b as illustrated in FIGURES 7 and 8. Thus, the heel portion 18b thereof must provide resistance to rotation of the perforated board fixture about an axis perpendicular to the perforated board in the manner of the heel portion of the clip retainer 10 A.

The clip retainer 10c illustrated in FIGURES 9 and 10 includes a heel portion 18c and body portion 16c similar to the heel portion and body portion 18b and 16b of the clip retainer 10b and, in addition, includes a toe portion 20c in conjunction therewith, as illustrated best in FIGURE 10 whereby rotation of the perforated board fixture and clip retainer in assembly about an axis perpendicular to the plane of the perforated board 12c through the opening 32c is positively prohibited.

Another modified clip retainer 10d is illustrated in FIGURES 11, 12 and 13. The clip retainer 10d is shown in conjunction with a perforated board fixture 14d of the type adapted to be used in conjunction with a flange on a container slidablee in channels 40 and 42 provided on the perforated board fixture 14d. Perforated board fixture 14d includes locking portions 44 and 46 thereon adapted to extend through openings 48 and 50 respectively in the perforated board. The locking portions 44 and 46 in conjunction with the body portion 52 of the perforated board fixture 14d, position the channels 40 and 42 in a substantially horizontal position.

The clip retainer 10d is provided with a heel portion 18d and an opening 28d extending therethrough which functions in conjunction with the locking member 46 of the perforated board fixture 14d in the manner in which the heel 18 and opening 28 function in conjunction with the perforated board fixture 14 shown in FIGURE 1 to prevent rotation of the perforated board fixture 14d about an axis in the plane of the perforated board through the openings 48 and 50 when the open returned portion 54 of the clip retainer 10d is rotated into a position wherein the body part 52 of the fixture 14d is held therein, as shown in FIGURE 11. The perforated board fixture 14d, having two locking members adapted to fit through openings in the perforated board, requires no toe portion on clip retainer 10d to prevent rotation thereof about an axis perpendicular to the perforated board as will be understood.

The drawings and the foregoing specification constitute a description of the improved perforated board clip retainer in such full, clear, concise and exact terms as to enable any person skilled in the art to practice the invention, the scope of which is indicated by the appended claims.

What I claim as my invention is:

1. The combination with an upright board having spaced upper and lower openings therein, of an upright clip retainer upon one side of and substantially parallel to said upright board, said clip retainer having an opening in registration with the upper opening in said board and having a toe portion extending through the lower opening in said board, means on the toe portion of said clip retainer overlapping the opposite side of said board to hold said clip retainer against accidental removal from said board, and a fixture having an upright body portion substantially parallel to said upright clip retainer and said upright board and having a portion extending through the registering openings in said retainer and board, means on the portion of said fixture overlapping the opposite side of said board to hold said fixture against accidental removal from said board, and means on said retainer extending transversely across and holding the body portion of said fixture in an upright position, said last mentioned means opening laterally and permitting said body portion to move laterally therefrom about the axis of the portion aforesaid while said portion is extending through said registering openings.

2. The combination with an upright board having spaced upper and lower openings therein, of an upright clip retainer upon one side of said upright board, said clip retainer having an opening in registration with the upper opening in said board and having a toe portion extending through the lower opening in said board, and a fixture having an upright body portion substantially parallel to said upright board and having a portion extending through the registering openings in said retainer and board, means on the portion of said fixture overlapping the opposite side of said board to hold said fixture against accidental removal from said board, and means on said retainer extending transversely across and holding the body portion of said fixture in an upright position, said last mentioned means opening laterally and permitting said body portion to move laterally therefrom about the axis of the portion aforesaid while said portion is extending through said registering openings.

3. The combination with an upright board having an opening therein, of an upright clip retainer upon one side of said upright board, said clip retainer having an opening in registration with the opening in said board, and a fixture having an upright body portion substantially parallel to said upright board and having a portion extending through the registering openings in said retainer and board, means on the portion of said fixture overlapping the opposite side of said board to hold said fixture against accidental removal from said board, and means on said retainer extending transversely across and holding the body portion of said fixture in an upright position, said last mentioned means opening laterally and permitting said body portion to move laterally therefrom about the axis of the portion aforesaid while said portion is extending through said registering openings.

4. The combination with an upright board having an opening therein, of an upright substantially flat clip retainer upon one side of said upright board, said clip retainer being provided substantially midway the upper and lower ends thereof with an opening in registration with the opening in said board, and a fixture having an upright body portion substantially parallel to said upright board and having a substantially straight horizontal portion extending through the registering openings in said retainer and board, means on the straight horizontal portion of said fixture overlapping the opposite side of said board to hold said fixture against accidental removal from said board, and means on said retainer extending transversely across and holding the body portion of said fixture in an upright position, said last mentioned means opening laterally and permitting said body portion to move laterally therefrom about the axis of the straight horizontal portion aforesaid while said portion is extending through said registering openings.

5. The combination with an upright board having spaced upper and lower openings therein, of an upright clip retainer upon one side of said upright board and having a toe portion extending through the lower opening in said board, and a fixture having an upright body portion substantially parallel to said upright board and having a portion extending through the upper opening in said board, means on the portion of said fixture overlapping the opposite side of said board to hold said fixture against accidental removal from said board, and means on said retainer extending transversely across and holding the body portion of said fixture in an upright position, said last mentioned means opening laterally and permitting said body portion to move laterally therefrom about the axis of the portion aforesaid while said portion is extending through said registering openings.

(References on following page)

References Cited in the file of this patent

UNITED STATES PATENTS

| | | |
|---|---|---|
| 2,147,910 | Martin | Feb. 21, 1939 |
| 2,234,989 | Tkach | Mar. 18, 1941 |
| 2,666,613 | Astleford | Jan. 19, 1954 |
| 2,841,353 | Burdick | July 1, 1958 |
| 2,884,221 | Messier | Apr. 28, 1959 |
| 2,911,104 | Hoffer | Nov. 3, 1959 |
| 2,961,724 | Alling | Nov. 29, 1960 |